Sept. 19, 1933.　　　A. E. YOUNG　　　1,927,432
MEASURING APPARATUS
Filed June 20, 1932　　　4 Sheets-Sheet 1
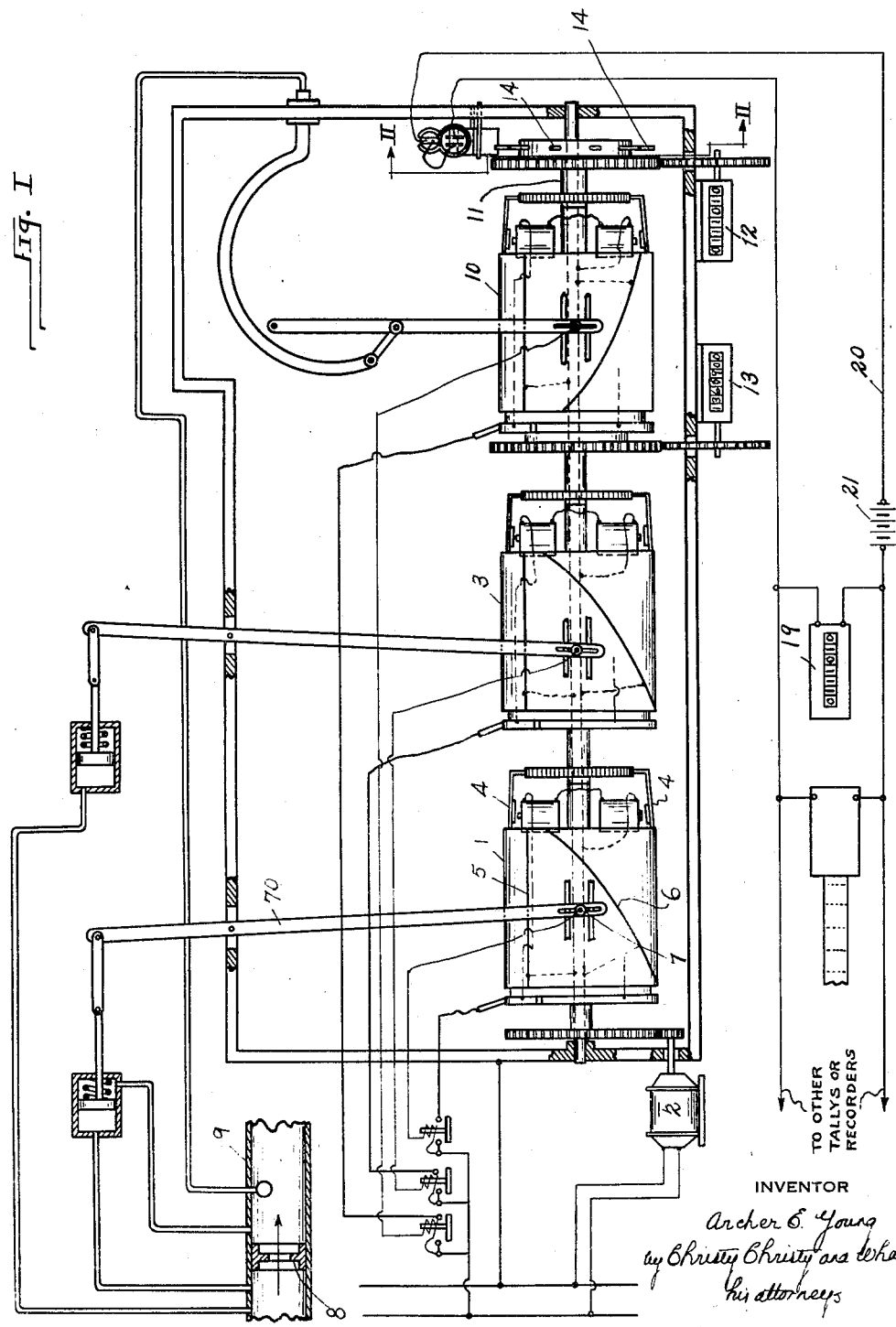
Fig. I
INVENTOR
Archer E. Young
by Christy Christy and Wharton
his attorneys

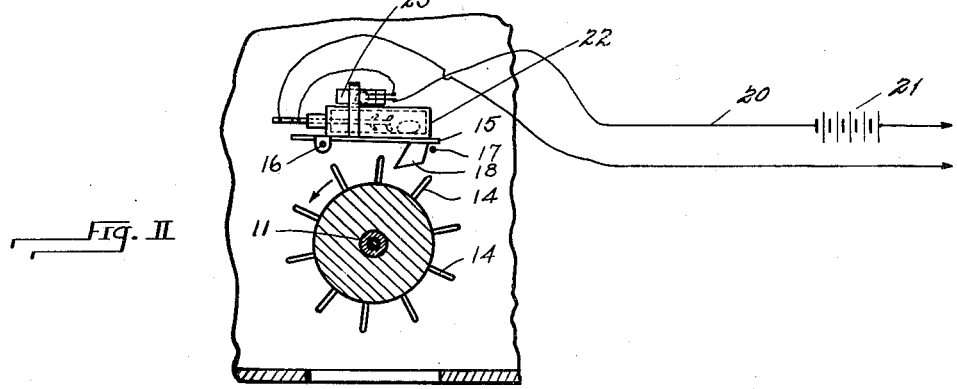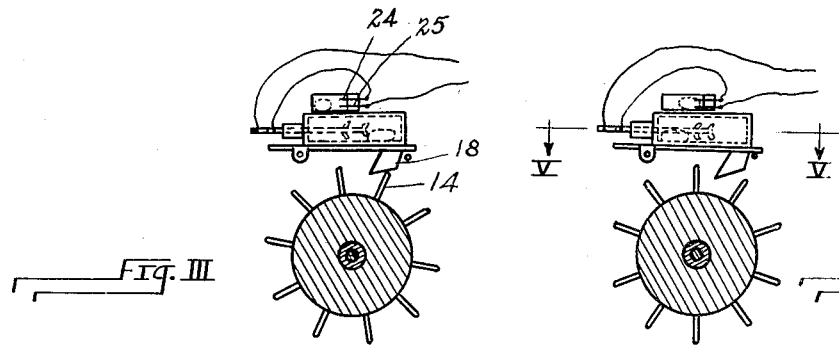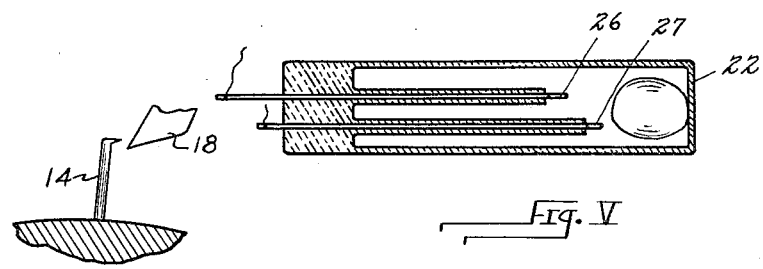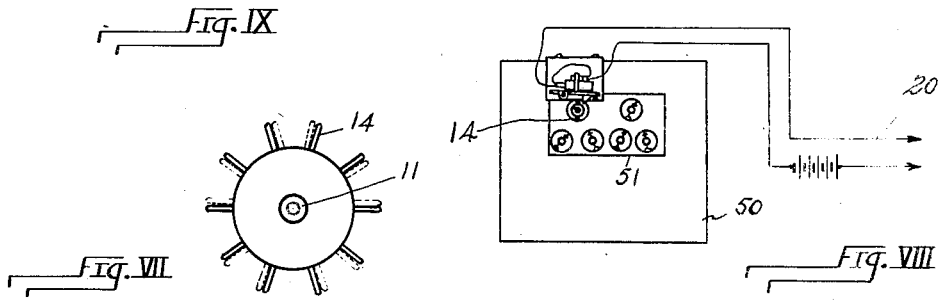

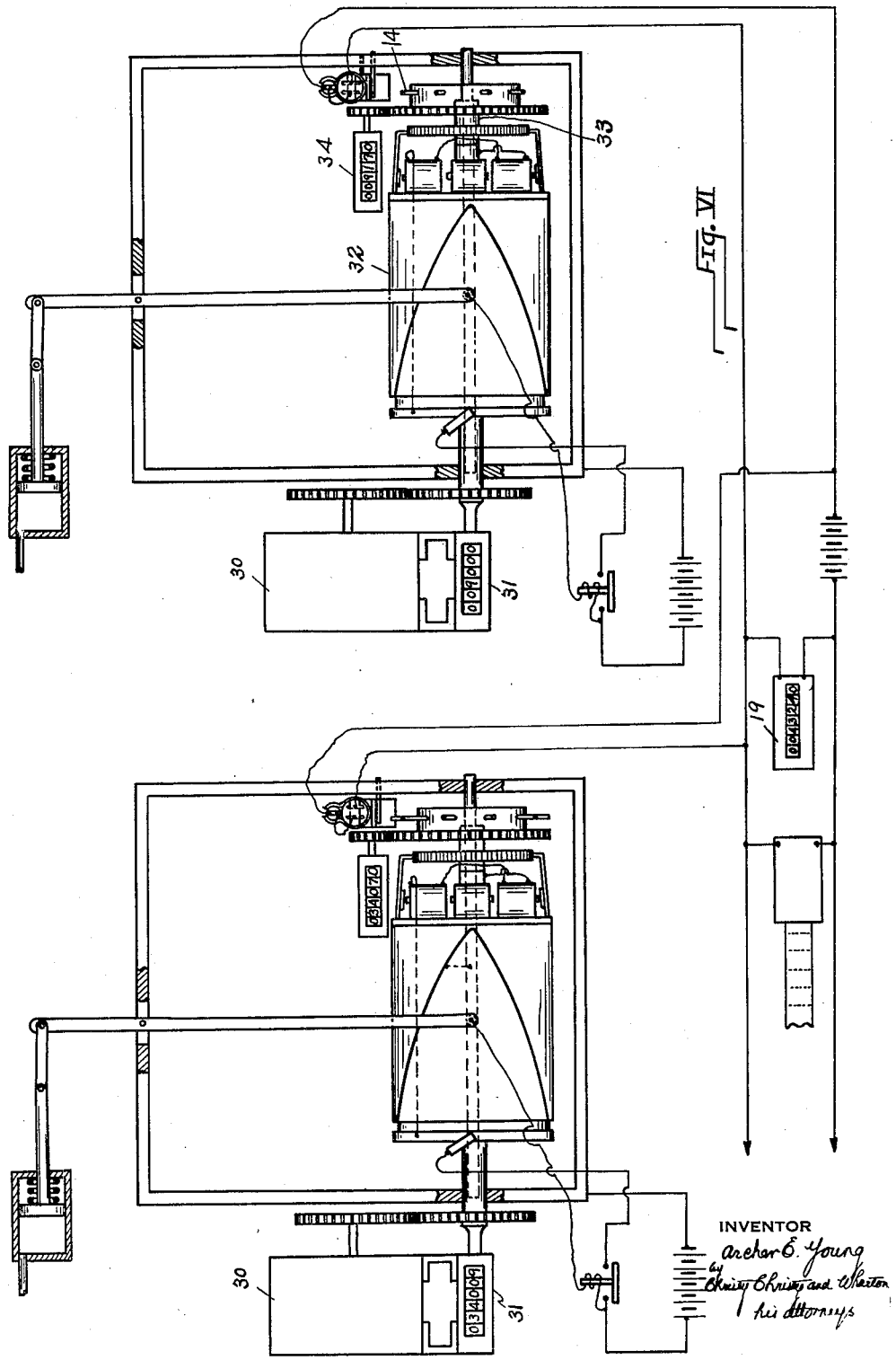

Sept. 19, 1933. A. E. YOUNG 1,927,432
MEASURING APPARATUS
Filed June 20, 1932 4 Sheets-Sheet 4
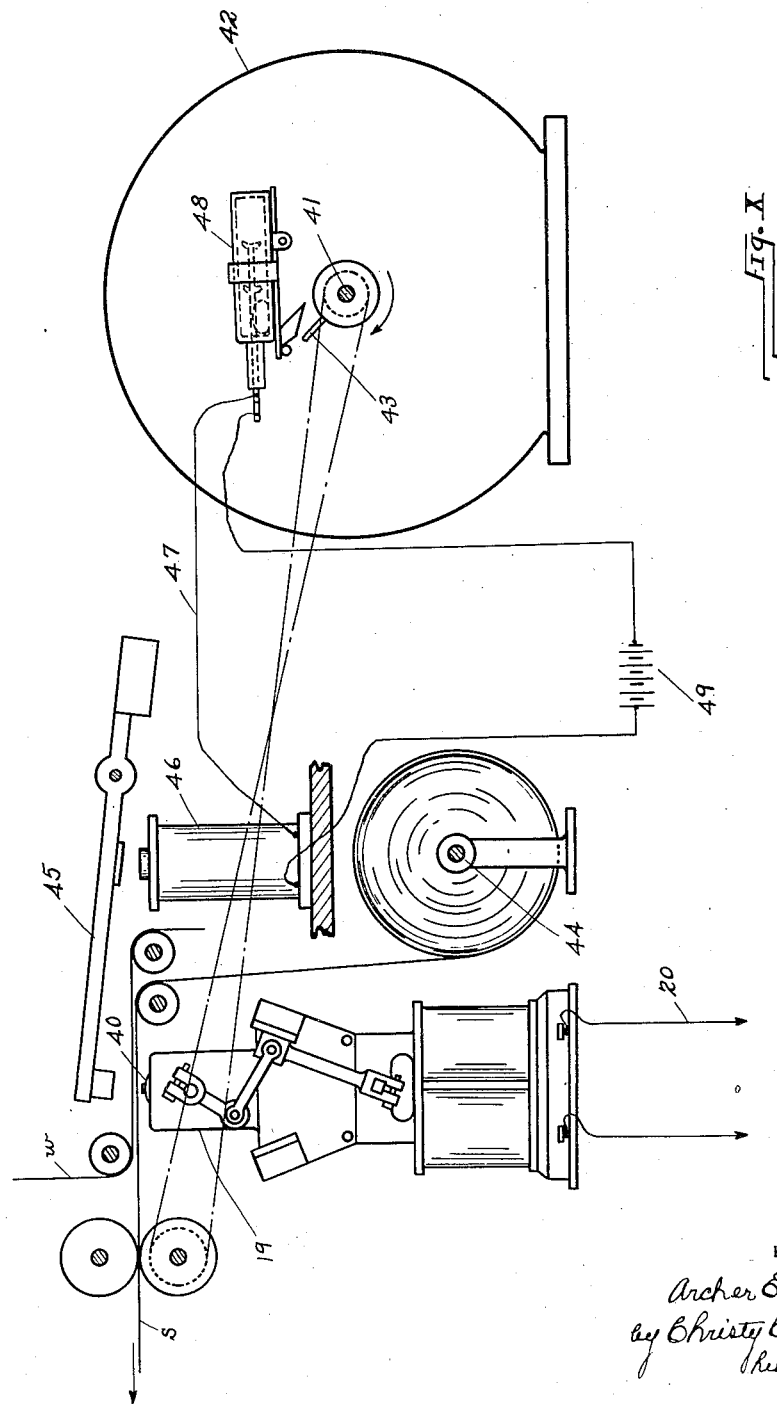
INVENTOR
Archer E. Young
by Christy Christy and Wharton
his attorneys Patented Sept. 19, 1933

1,927,432

UNITED STATES PATENT OFFICE 1,927,432

MEASURING APPARATUS

Archer E. Young, Pittsburgh, Pa.

Application June 20, 1932. Serial No. 618,161

3 Claims. (Cl. 235—61)

My invention relates to measuring apparatus and consists in means associated with a meter for indicating at any chosen point, near or remote, the readings of the meter—or, associated with a plurality of meters, for indicating the summation of the meter readings. This application is, in part, a continuation of an application for Letters Patent, filed by me March 31, 1932, Serial No. 602,149.

In the accompanying drawings Fig. I is a diagrammatic view, partly in elevation, partly in section, illustrating my present invention in association with a single gas meter of the character described in Letters Patent of the United States, No. 1,865,996, granted me July 5, 1932 and No. 1,887,254, granted me November 8, 1932. Fig. II is a fragmentary view in section, on the plane indicated by the line II—II, Fig. I; Figs. III and IV are similar views which, in association with Fig. II, serve to illustrate certain features of operation; Fig. V is a view to larger scale, showing in horizontal section a member which in Figs. II—IV is shown in side elevation; Fig. VI is a view similar in character to Fig. I, illustrating the invention in association with two gas meters of the same general class or character as that of Fig. I, but specifically such as shown and described in my application for United States Letters Patent, filed December 12, 1931, Serial No. 580,580; Fig. VII illustrates a refinement in the relative proportions of two members, one of which appears in Figs. II—IV, which may advantageously be adopted in case more meters than one are associated together, as in the showing of Fig. VI; Fig. VIII is a diagrammatic illustration of the invention in association with a volumetric gas meter of familiar type, equipped with a tally; Fig. IX is a fragmentary view illustrating a refinement in the structure of a certain member shown in Figs. II—IV; Fig. X is a fragmentary and diagrammatic view of apparatus such as may be installed at any convenient place, near to or remote from an orifice meter, for example, or other apparatus for summating or aggregating or integrating values, to afford at such convenient place printed record of instant values at succeeding intervals of time.

Referring first to Fig. I, an orifice meter is shown in association with a gas main. The instrument includes a cylinder 1 mounted for rotation, and it may be understood that when the instrument is in operation this cylinder is constantly rotated at uniform speed, as by an electromotor 2. Aligned axially with cylinder 1 a second cylinder 3 is rotatably mounted, and movable clutch members 4 are provided for intermittently uniting the cylinder 3 with cylinder 1, so that when the clutch is effective the two cylinders rotate in unison. The cylinder 1 is provided with a pair of divergently extending contact strips 5 and 6, and adjacent cylinder 1 a brush 7 is movable. The position of brush 7 along its range of movement is, through the swinging of an arm 70 which carries it, responsive to the differential pressure in the stream of gas flowing through an orifice 8 in the main 9; and throughout all its range the brush 7 is so positioned as to be engaged by the contact strips 5 and 6 upon the rotating cylinder 1. The clutch by which cylinder 3 is intermittently united with cylinder 1 is electrically controlled, and the controlling means are energized by the making of contacts between the strips 5 and 6 and the brush 7. Accordingly, with each rotation of cylinder 1, cylinder 3 rotates through a fraction of a rotation, and that fraction is great or small, according to the instant value of the differential pressure in the gas stream. A third cylinder 10 is associated with cylinder 3, as cylinder 3 is associated with cylinder 1, and by like means, in the course of each complete rotation of cylinder 3, cylinder 10 may be caused to turn through the fraction of a rotation, and the value of that fraction will be great or small, according to the instant value of the static pressure of the gas flowing in main 9. Yet another rotating member, the member 11, is mounted for rotation in the instrument, in axial alignment with cylinder 10, and by like means, during each complete rotation of cylinder 10, member 11 may be caused to turn through a fraction of a complete rotation, and the value of that fraction will be great or small, according to the instant value of the temperature of the gas flowing in the main. Member 11 is the driving member of tally 12, and it needs only a proper proportioning of parts to cause tally 12 to afford a reading in terms of volume of the quantity of gas passing through the main, corrected in respect both to differential pressure, static pressure, and temperature. Another tally, 13, driven by cylinder 10, may be present, and it will give a reading corrected for variations in differential and static pressures, though not corrected for variations in temperature. All these matters are explained in greater detail in the patents named above, Nos. 1,865,996 and 1,887,254. The present invention is predicated upon the member 11, rotating in accordance with gas flow, and in this instance with correction for variations in differential pressure, static pressure, and temperature. Tally 12 is driven by member 11, through the gear mechanism indicated in Fig. I.

Considering now Fig. II in association with Fig. I, the rotary member 11 is shown to be provided with a plurality of radially extending arms 14. The axis of rotation of member 11 may be understood to be horizontal. Arranged above member 11 in such position as to permit co-operation by arms 14 is a carrier 15, pivoted on a horizontal axis, and adapted to be swung from and to return to the position shown in Fig. II—the position, namely, of rest upon a stationary support 17. The carrier 15 is suitably adapted, as by the provision of an abutment 18, to be engaged successively by the arms 14 as member 11 rotates, and to be swung upward and then allowed to drop again, in oscillation upon its axis 16. In this instance member 11 is provided with ten arms 14 (the number is within obvious limits arbitrarily fixed), and with each rotation of member 11 carrier 15 oscillates ten times.

At a suitable point, near to the instrument or remote from it—it matters not,—an electrically operated tally 19, conveniently a magnetic counter, is arranged. Magnetic counters are known; their characteristic is that with each pulsation of current in a circuit the counter mechanism is advanced one step. And in this case the circuit 20 with which tally 19 is associated, including a source of current 21, includes also a make-and-break device mounted on carrier 15—to the end that each oscillation of carrier 15 will effect the advance of tally 19 by one step.

The make-and-break device which I conveniently and preferably employ is that of my pending application, Serial No. 570,025, filed Oct. 20, 1931. Carrier 15 bears two glass tubes 22 and 23, through the walls of each of which extend two terminal pieces, and these two pairs of terminal pieces are arranged in series in the circuit 20. Within each tube a globule of mercury is freely movable. The two tubes, both rigidly mounted on carrier 15, are so arranged that when the carrier rests upon support 17 the globules in both tubes rest at the corresponding ends of the tubes—the right-hand ends, as seen in Fig. II; and as the carrier 15 is by the advance of one of the arms 14 swung, the two globules of mercury run to the opposite ends of the tubes—the left-hand ends, Fig. II. The proportions of the tubes and the positions of the terminals within them are such that the circuit is completed but once in each to-and-fro oscillation of carrier 15. When the parts are in the positions seen in Fig. II, the globule of mercury in the upper and smaller tube 23 is in contact with both of the pair of terminals which penetrates the walls of that tube, but the globule in tube 22 is in engagement with neither of the terminals of the pair with which that tube is equipped. The terminals 24, 25 in the upper and smaller tube are exposed side by side at one end of the tube; those in tube 22 (the terminals 26 and 27) are arranged in longitudinal succession in a medial portion of the tube. This is best seen in Fig. V, which is a view in longitudinal and horizontal section through tube 22. The parts being positioned as shown in Fig. II, a swinging of carrier 15 by an advancing arm 14 will reverse the inclination of the tubes 22 and 23; but by virtue of the proportions of the tubes or their minute relative positions, or both, the globule in tube 23 will break contact with its associated terminals before the globule in tube 22 advancing along the tube makes simultaneous contact with its two associated terminals. On the reverse swing, however, when arm 14 has passed beyond engagement with abutment 18 and carrier 15 swings by gravity in clockwise direction, the globule in tube 23 reaches the right-hand end of the tube and makes contact with its associated terminals so promptly that when the globule advancing within tube 22 comes to the position of simultaneous contact with its two associated terminals 26 and 27 the circuit is completed. Fig. II shows the make-and-break device in inactive position, as it stands between successive oscillations; Fig. III shows it in the course of the upward swing of carrier 15, with contact in the upper tube broken before contact in the lower is made; and Fig. IV shows it on the instant of completion of downward swing, after contact has been made in the upper tube, but before contact has been made in the lower. Fig. V shows the two terminals 26 and 27 to extend and to be sealed through an end wall of tube 22, and it shows them to be jacketed in glass throughout the greater part of their extent, and to be bare at their tips only; this to the end that connection between them shall be bridged only when the globule of mercury is in mid course, in passing from one end of the tube to the other. The tips of these terminals 26 and 27 are extended vertically, as clearly appears in Figs. II—IV, to facilitate the making and breaking of contact. This specific form of make-and-break device is minutely shown and described in my application 570,025, mentioned above. In order to define with greatest precision the instant of the downward and effective swing of carrier 15, the tip of the arm 14 may be tapered rearwardly, as indicated in Fig. IX. With each closing of circuit, tally 19 advances one step.

What the tally 19 really registers is the number of tenths of a complete rotation through which the member 11 has turned. This for practical purposes suffices. The reading of tally 19 may be in units of volume, or in other terms—in dollars and cents, for instance; and it is a matter of proportioning of parts, well known to the industry, to make it accurate, whatever be the unit of measure.

Turning again to Fig. I, it will be perceived that two tallies are provided; and that whereas one of them, the tally 12, is situated in immediate association with, and indeed forms part of the instrument, the other, the tally 19, may be situated where one will. If the instrument be situated in the cellar of a dwelling, for example, the tally 19 may be situated on an upper floor, where it may be more conveniently inspected; or, again, the instrument being situated somewhere in the extent of a line (or even in a consumer's premises), the tally 19 may be situated at the home office of the utility company. In case of a domestic installation, the tally may be situated where it may readily be consulted, and in such service particularly it may be desirable to have the reading in terms of dollars and cents.

The orifice meter will ordinarily be situated adjacent to the orifice plate 8; that is to say, at some point along the extent of the gas main; the tally 19 will be situated at such place as is convenient. Indeed, it is intended to make possible the situation of this tally 19 wherever one will, regardless of the particular situation of the orifice meter. By way of example, it may be understood that tally 19 is situated in the office of a public-service corporation and at a point remote from the gas main. Tally 19 affords at such remote and (for other reasons) convenient point a substantially accurate duplicate of the reading of tally 12.

The tally 19 may be equipped with a type wheel 40 and printing mechanism may be associated with the so equipped tally 19, as illustrated in Fig. X. This printing mechanism includes a shaft 41 driven at constant rate by a motor 42 and equipped with an arm 43. Rotation of shaft 41 is effective, through the instrumentalities indicated, to draw a strip s of paper from a reel 44 across the face of type wheel 40 and beneath a suitable ink-surfaced web w. Cooperating with the type wheel 40, to effect periodic printing upon strip s, is a printing lever 45. The lever is weighted, to hold it normally in inactive position. It is swung periodically to effect printing by means of a solenoid 46, which when energized attracts to itself the lever which to suitable and sufficient extent is for this purpose formed of magnetic material. The solenoid is periodically energized by a circuit 47, in which is included a make-and-break device 48. The make-and-break device here shown is specifically that described in my pending application for Letters Patent, filed May 4, 1932, Serial No. 609,070. It includes a tube in which two terminals are sealed and within which a globule of mercury is movable; the terminals are so situated and proportioned and the globule of mercury is so proportioned relatively to them, that on the relatively slow swing of the tube in one direction the elongated globule will flow through the tube without closure of contact, and on the relatively rapid swing of the tube in opposite direction, the compact and thicker globule will as it advances close contact. In such detail this make-and-break device of Fig. X is unlike that of Figs. I-V, already described; but in both the circuit is closed only once in the course of each to-and-fro oscillation of the tube; and in either situation either specific form of make-and-break device may be used.

The arm 43 borne by shaft 41 cooperates to effect the closing and the breaking again of circuit 47 once with each rotation of shaft 41. With each closing of circuit electric energy from source 49 energizes solenoid 46 and effects printing upon strip s of the instant value of the reading of tally 19. The type wheel 40 may be and, of course, ordinarily will be a compound member, as is common in the register wheels of tallies.

At the office then of the public-utilities company (or at other desired places) a record is automatically produced in the form of a tape which bears, printed upon it, at regularly spaced intervals, whose spacing is indicative of lapse of time, the sequent values of the gas flow (or other summation of integration of values effected by the integrating instrument) at those particular past instants.

Fig. I indicates that in the circuit 20 more instruments than one may be included, and such an assembly is more fully illustrated in Fig. VI. Here two instruments are shown, diagrammatically placed side by side; it will however be understood that they are here intended to represent a plurality of instruments, remotely situated in the field, each measuring a separate flow of gas consumed. For example, each may be an installation on the premises of one of a plurality of consumers.

Each installation, as here shown, includes a volumetric meter 30 having associated with it a tally 31. Associated with each tally and rotatable in unison with the driving shaft of the tally is a cylinder 32. Axially aligned with each cylinder 32 is a rotatable member 33; and means are provided, essentially such as have already been described, by which, with each rotation of cylinder 32, member 33 turns through a fraction of a complete rotation; and that fraction will be great or less, according to the instant value of the static pressure of the gas flowing in the line. A tally 34, driven by member 33, may by proper proportioning of parts in known manner be caused to indicate the volume of gas flowing, with correction for variation in pressure of supply, or static pressure. The particular form of instrument shown is that which is shown and described in Letters Patent of the United States No. 1,816,949, granted me August 4, 1931, and in application Serial No. 580,580, mentioned above.

In this case also each rotary member 33 is arranged to turn on a horizontally extending axis, and each has associated with it those parts and members which are illustrated in Figs. II-V in association with the rotary member 11, and it is unnecessary again to describe those parts and members.

In this case, as has been intimated, a single tally 19 is shown in association with a plurality of individual installations. As each make-and-break device is closed, tally 19 will be advanced one step; and thus a central tally 19 may give summation of consumption through a plurality of lines or at a plurality of points.

It is conceivable that, with a plurality of instruments so associated with a single tally 19, the closing of circuit in two instruments may occur at a single instant, in which case the record would be but half of what the record should be. On the other hand, with the member 33 turning once in a minute, and the interval between arms 14 thus having a time value of 6 seconds, the minute value of the time of contact is to be borne in mind: about one twentieth of a second. That is to say, the chance of coincident operation of two make-and-break devices is 1:120. To that extent, coincidence is practically negligible. In order, however, to prevent a sequence of coincident operations, as between two instruments, the arms 14 may be displaced from exact correspondence. This is indicated in Fig. VII, where in full lines the arms of one instrument are shown, and in dotted lines the location of the arms of another instrument are diagrammatically shown. A relative displacement of the two sets of arms is thus made manifest. Such slight displacement from regular spacing will have no appreciable effect to disturb the adequacy and accuracy of record, and yet the expedient will suffice to insure that there will be no sequence of coincident operation of two instruments. And, even though it be the case that there be an occasional coincident operation of two make-and-break devices organized with a single central tally, the organization will be practically adequate. It may serve to inform a superintendent in a central office approximately what the consumption is—and that is what he needs to know, and to know promptly. When it comes to actual computations and charge-making, the readings of the several tallies 34 may still be depended on. The instantaneous automatic imparting of information to the central office of total consumption is a valuable practical achievement, not hitherto attained.

In Fig. VIII, I have indicated that the circuit 20 of the distant tally 19, including such a make- and-break device as those described, may be immediately associated with an ordinary volumetric meter 50. The meter is equipped with a tally 51, and with the rotary driving shaft of the tally the instrumentalities shown in Figs. II–V may be associated. In Fig. VIII, I show this shaft to be equipped with a plurality of the arms 14.

The printing device illustrated in Fig. X is manifestly applicable, whether the tally 19 be responsive to a single integrating instrument, or to a plurality of instruments, as particularly shown in Fig. VI.

I claim as my invention:

1. In measuring apparatus the combination of two integrating instruments each including a movable element which in a given interval moves through a range which is great or small, according to the instant value of the quantities integrated, an electrically operated tally, a circuit including said tally, two make-and-break devices arranged in said circuit, each of said make-and-break devices being associated with the movable element of one of the two said instruments and closing and opening in response to movement of such movable element.

2. In measuring apparatus the combination of two measuring instrumentalities including each a member movable in accord with the quantity measured, an electrically operated tally, a circuit including the said tally, two make-and-break devices arranged in the said circuit, each of the said make-and-break devices being associated with the movable element of one of the two said instrumentalities and closing and opening in response to movement of such movable member.

3. In measuring apparatus the combination of two meter installations, each including a rotary member, an electrically operated tally, a circuit including said tally, two make-and-break devices arranged in said circuit and associated, one with each of said meter installations, and each including an oscillator member, the rotary members of the two installations being provided, each with a plurality of radially extending arms, the spacing of the arms of the two said rotary members being out of accordance one with the other.

ARCHER E. YOUNG.